US012407148B2

(12) United States Patent
Nakamura et al.

(10) Patent No.: US 12,407,148 B2
(45) Date of Patent: Sep. 2, 2025

(54) SPARK PLUG

(71) Applicant: Niterra Co., Ltd., Nagoya (JP)

(72) Inventors: Kaito Nakamura, Nagoya (JP); Daisuke Sumoyama, Nagoya (JP); Takaaki Kikai, Nagoya (JP); Kengo Hattori, Nagoya (JP)

(73) Assignee: NITERRA CO, LTD., Nagoya (JP)

( * ) Notice: Subject to any disclaimer, the term of this patent is extended or adjusted under 35 U.S.C. 154(b) by 0 days.

(21) Appl. No.: 18/571,546

(22) PCT Filed: Jul. 12, 2022

(86) PCT No.: PCT/JP2022/027443
§ 371 (c)(1),
(2) Date: Dec. 18, 2023

(87) PCT Pub. No.: WO2023/013371
PCT Pub. Date: Feb. 9, 2023

(65) Prior Publication Data

US 2024/0291244 A1 Aug. 29, 2024

(30) Foreign Application Priority Data

Aug. 2, 2021 (JP) ................................ 2021-126835

(51) Int. Cl.
*H01T 13/39* (2006.01)

(52) U.S. Cl.
CPC .................................. *H01T 13/39* (2013.01)

(58) Field of Classification Search
CPC ..................................................... H01T 13/39
See application file for complete search history.

(56) References Cited

U.S. PATENT DOCUMENTS 6,472,801 B1 * 10/2002 Matsubara .............. H01T 13/52 313/143
2014/0097739 A1 * 4/2014 Sumoyama ............. H01T 13/39 313/141
2015/0236482 A1 * 8/2015 Kowalski ................ H01T 21/02 313/142

(Continued)

FOREIGN PATENT DOCUMENTS

JP H05-54955 A 3/1993
JP 2001-262253 A 9/2001

(Continued)

OTHER PUBLICATIONS

Written Opinion (English translation) from corresponding International Patent Application No. PCT/JP22/27443, mailed Sep. 20, 2022.

(Continued)

*Primary Examiner* — Kevin Quarterman
(74) *Attorney, Agent, or Firm* — RENNER, OTTO, BOISSELLE & SKLAR, LLP

(57) ABSTRACT

A spark plug which is reduced in consumption of a discharge member, thereby having a longer service life. This spark plug is provided with: a first electrode that comprises a discharge member; and a second electrode that faces the discharge member, with a spark gap lying therebetween. The discharge member is mainly composed of Ru, while containing 0.5% by mass to 30% by mass of Ni or Co.

3 Claims, 1 Drawing Sheet

(56) References Cited

U.S. PATENT DOCUMENTS

| | | | | |
|---|---|---|---|---|
| 2015/0380906 | A1* | 12/2015 | Inoue | H01T 13/32 313/141 |
| 2017/0033540 | A1* | 2/2017 | Suzuki | H01T 13/32 |

FOREIGN PATENT DOCUMENTS

| | | | | | |
|---|---|---|---|---|---|
| JP | 2007214136 | A | * | 8/2007 | H01T 13/39 |
| JP | 2020-140800 | A | | 9/2020 | |

OTHER PUBLICATIONS

International Search Report from corresponding International Patent Application No. PCT/JP22/27443, mailed Sep. 20, 2022.
Written Opinion from corresponding International Patent Application No. PCT/JP22/27443, mailed Sep. 20, 2022.

* cited by examiner

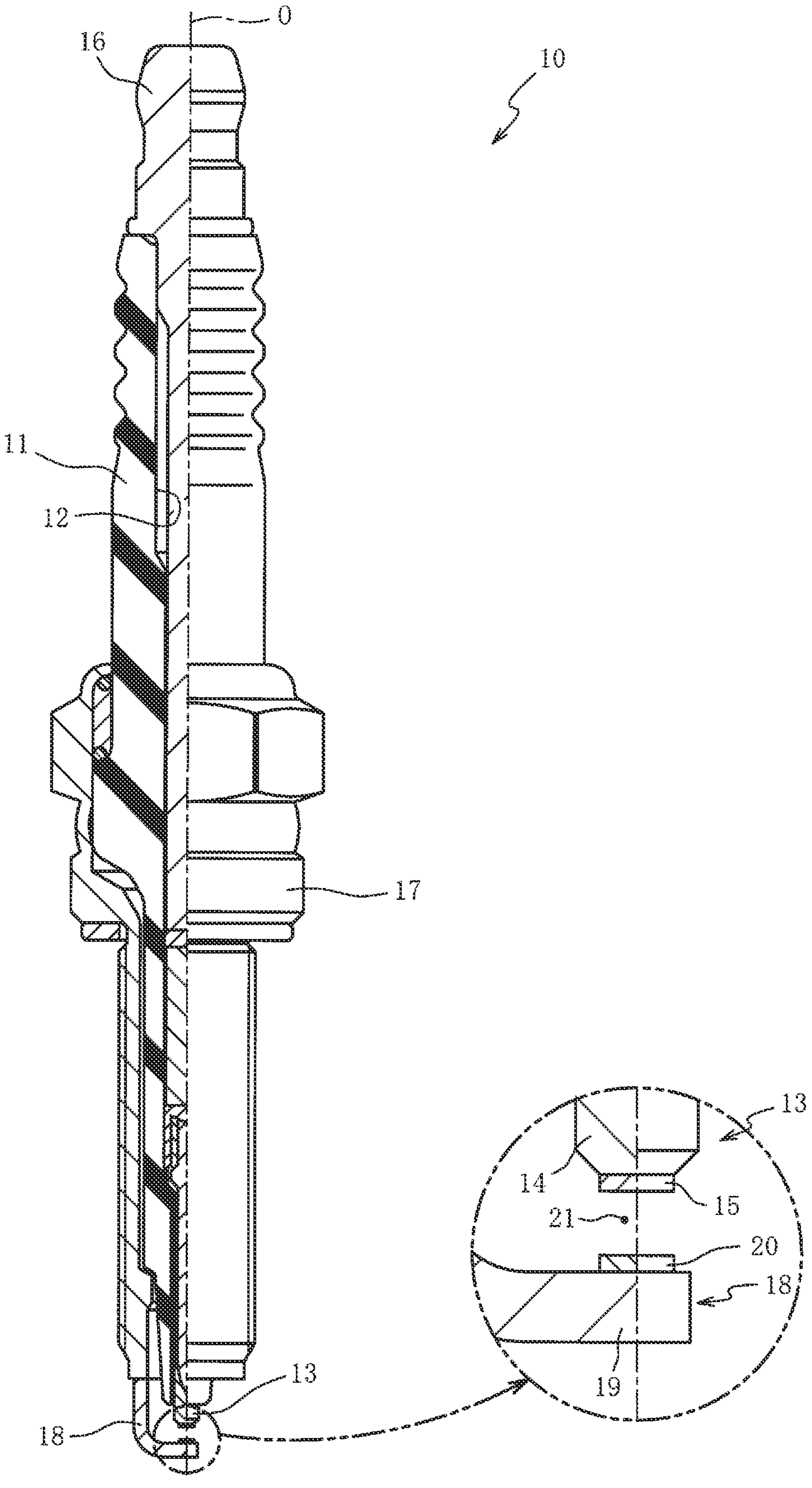
0
10
16
11
12
17
13
18
14
15
21
20
19

SPARK PLUG

FIELD OF INVENTION

The present invention relates to a spark plug provided with a discharge member containing Ru.

BACKGROUND OF INVENTION

Japanese Patent Application Laid-Open (kokai) No. H05-54955 ("Patent Document 1") discloses a conventional art provided with a discharge member made of Ru alone or an Ru alloy, in a spark plug including a first electrode including the discharge member and a second electrode opposed to the discharge member with a spark gap therebetween.

Since Ru is remarkably oxidized and volatilized at high temperature, the discharge member in the conventional art is easily worn and thus the service life of the spark plug may be exhausted early.

SUMMARY OF INVENTION

The present invention has been made to solve the above problem, and an object of the present invention is to provide a spark plug capable of inhibiting the discharge member from being worn and prolonging the service life.

In order to achieve the above object, a spark plug of the present invention includes a first electrode including a discharge member, and a second electrode opposed to the discharge member with a spark gap therebetween, and the discharge member contains Ru as a main component and not lower than 0.5% by mass and not higher than 30% by mass of Ni or Co.

In a spark plug according to the present invention, a discharge member can be inhibited from being worn, thereby prolonging the service life.

BRIEF DESCRIPTION OF THE DRAWINGS

FIG. 1 is a cross-sectional view of a spark plug according to one embodiment.

DETAILED DESCRIPTION OF INVENTION

Hereinafter, a preferred embodiment of the present invention will be described with reference to the accompanying drawing. FIG. 1 is a half cross-sectional view of a spark plug 10 in one embodiment, with an axial line O being the boundary. In FIG. 1, the lower side of the drawing sheet is referred to as a front side of the spark plug 10, and the upper side of the drawing sheet is referred to as a rear side of the spark plug 10.

As shown in FIG. 1, the spark plug 10 includes a center electrode 13 (first electrode) and a ground electrode 18 (second electrode). An insulator 11 insulates the center electrode 13 and the ground electrode 18 from each other. The ground electrode 18 is connected to a metal shell 17. The insulator 11 is a substantially cylindrical member formed from alumina or the like having excellent mechanical properties and insulation property at high temperature. The insulator 11 has an axial hole 12 penetrating therethrough along the axial line O.

The center electrode 13 is a rod-shaped electrode disposed in the axial hole 12 along the axial line O. The center electrode 13 includes a base material 14, and a discharge member 15 provided at the front end of the base material 14. In the base material 14, a core material having excellent thermal conductivity is embedded. The material of the base material 14 is, for example, Ni or an alloy containing Ni as a main component, and the material of the core material is, for example, Cu or an alloy containing Cu as a main component. The core material may be omitted. The material of the discharge member 15 is a metal containing Ru as a main component. The discharge member 15 is fixed to the base material 14 by laser welding, resistance welding, diffusion bonding, or the like.

A metal terminal 16 is a rod-shaped member to which a high-voltage cable (not shown) is connected, and a front side thereof is disposed in the axial hole 12 of the insulator 11. The metal terminal 16 is electrically connected to the center electrode 13 in the axial hole 12.

The metal shell 17 is a substantially cylindrical member made of metal that is fixed in a screw hole (not shown) of an internal combustion engine. The metal shell 17 is formed from a metal material (e.g., low-carbon steel or the like) having conductivity. The metal shell 17 is fixed to an outer circumference of the insulator 11. The ground electrode 18 is connected to the metal shell 17.

The ground electrode 18 includes a base material 19 that is connected to the metal shell 17, and a discharge member 20 provided to the base material 19. In the base material 19, a core material having excellent thermal conductivity is embedded. The material of the base material 19 is an alloy containing Ni as a main component, and the material of the core material is Cu or an alloy containing Cu as a main component. The core material may be omitted. The discharge member 20 is formed from a noble metal such as Pt, Ir, Ru, or Rh, or W having higher spark wear resistance than that of the base material 19, or an alloy containing a noble metal or W as a main component. The discharge member 20 is fixed to the base material 19 by laser welding, resistance welding, diffusion bonding, or the like. The ground electrode 18 is opposed to the discharge member 15 of the center electrode 13 with a spark gap 21 therebetween.

The spark plug 10 is produced, for example, by a method described below. First, the center electrode 13 is inserted into the axial hole 12 of the insulator 11. Next, the metal terminal 16 is inserted into the axial hole 12, and electrical connection is ensured between the metal terminal 16 and the center electrode 13. Thereafter, the metal shell 17 with the ground electrode 18 connected thereto in advance is mounted to the outer circumference of the insulator 11. The ground electrode 18 is bent so as to form the spark gap 21 between the center electrode 13 and the ground electrode 18, whereby the spark plug 10 is obtained.

The discharge member 15 contains Ru as a main component, and not lower than 0.5% by mass and not higher than 30% by mass of Ni or Co. Preferably, the discharge member 15 contains Ru as a main component, and not lower than 5% by mass and not higher than 25% by mass of Ni or Co. Ru is a high-melting-point metal and thus is used as a main component of the discharge member 15. A main component is an element having the largest content among contents of elements constituting the discharge member 15. The content of Ru is preferably not lower than 50% by mass, and more preferably not lower than 60% by mass or not lower than 70% by mass, with respect to the total amount of all components constituting the discharge member 15.

The discharge member 15 may contain another metal element than Ru, Ni, and Co. Examples of the other metal element include platinum group elements (Rh, Pd, Os, Ir, Pt) and Cr. The content of the other metal is, for example, not higher than 3% by mass.

The discharge member 15 may contain an oxide such as $Y_2O_3$ or $Al_2O_3$, other than Ru, Ni, Co, and the other metal element. The content of the oxide is, for example, not higher than 8% by mass.

Ni or Co is an element for reducing oxidation wear of Ru. Ni or Co has a property of being less likely to be oxidized than Ru. The content of Ni is not lower than 0.5% by mass and not higher than 30% by mass, preferably not lower than 5% by mass and not higher than 30% by mass or not lower than 0.5% by mass and not higher than 25% by mass, and more preferably not lower than 5% by mass and not higher than 25% by mass, with respect to the mass of the discharge member 15. If the content of Ni is lower than 0.5% by mass, the oxidation wear of Ru hardly decreases. If the content of Ni exceeds 30% by mass, the melting point of the discharge member 15 is greatly lowered and the spark wear resistance of the discharge member 15 tends to decrease.

The content of Co is not lower than 0.5% by mass and not higher than 30% by mass, preferably not lower than 5% by mass and not higher than 30% by mass or not lower than 0.5% by mass and not higher than 25% by mass, and more preferably not lower than 5% by mass and not higher than 25% by mass, with respect to the mass of the discharge member 15. If the content of Co is lower than 0.5% by mass, the oxidation wear of Ru hardly decreases. If the content of Co exceeds 30% by mass, the melting point of the discharge member 15 is greatly lowered and the spark wear resistance of the discharge member 15 tends to decrease.

The discharge member 15 may contain both Ni and Co. When the discharge member 15 contains both Ni and Co, the total content of Ni and Co is not lower than 0.5% by mass and not higher than 30% by mass, preferably not lower than 5% by mass and not higher than 30% by mass or not lower than 0.5% by mass and not higher than 25% by mass, and more preferably not lower than 5% by mass and not higher than 25% by mass, with respect to the mass of the discharge member 15. If the total content of Ni and Co is lower than 0.5% by mass, the oxidation wear of Ru hardly decreases. If the total content of Ni and Co exceeds 30% by mass, the melting point of the discharge member 15 is greatly lowered and the spark wear resistance of the discharge member 15 tends to decrease.

The discharge member 15 is obtained by powder metallurgy in which metal powder containing Ru and Ni (or Co) is molded and the obtained molded body is sintered. When the discharge member 15 is made by powder metallurgy, the discharge member 15 can be formed into any shape, for example, a circular disc, a truncated cone, an elliptic cylinder, or a polygonal column such as a triangular column or a quadrangular column.

In a molded body made of metal powder, densification and grain growth occur due to sintering. A sintering temperature, and the density of the discharge member 15 are correlated with each other. To improve spark wear resistance, the density of the discharge member 15 is preferably not lower than 95%. The density of the discharge member 15 is measured by the Archimedes method.

To reduce the oxidation wear of the discharge member 15, the discharge member 15 preferably has a less amount of dissolved oxygen. To reduce the amount of dissolved oxygen in the discharge member 15, metal powder, which is a raw material, preferably has a less amount of oxygen. The metal, which is a raw material, is vacuum melted to make metal powder by inert gas atomization, whereby the amount of oxygen in the metal powder can be reduced.

EXAMPLE

The present invention will be described in more detail with reference to examples. However, the present invention is not limited to the examples.

(Production of Samples)

An examiner vacuum melted mixtures obtained by mixing Ru metal and Ni metal in various proportions and mixtures obtained by mixing Ru metal and Co metal in various proportions, to obtain various metal powders by inert gas atomization. After the obtained metal powders were set into molds and were compressed to obtain columnar molded bodies, the molded bodies were sintered at about 2000° C. in a reducing atmosphere, whereby 35 kinds of discharge members having different proportions of Ru and Ni or different proportions of Ru and Co were obtained.

In addition, after mixtures obtained by mixing $Y_2O_3$ powder and metal powder were set into molds by the examiner and were compressed to obtain columnar molded bodies, the molded bodies were sintered at about 2000° C. in a reducing atmosphere, whereby two kinds of discharge members containing $Y_2O_3$ were obtained.

The chemical composition of the discharge member was measured using a wavelength dispersive X-ray spectrometer (WDS). As for measurement conditions, an acceleration voltage was 20 kV, a beam diameter was 20 μm, and a peak top of a measurement time was 10 seconds. The obtained discharge member had a columnar shape having a diameter of 0.8 mm and a thickness of 0.6 mm. The obtained discharge member had a density of not lower than 95% (by the Archimedes method).

The examiner produced center electrodes in which discharge members were respectively joined to base materials, and obtained sample Nos. 1 to 37 of spark plugs each provided with a spark gap between the discharge member of the center electrode and the ground electrode as in the above embodiment. The size of the spark gap of each sample was 0.75 mm.

(Test)

The examiner performed a test in which the examiner mounted each sample to an engine, caused spark discharge between the center electrode and the ground electrode, and operated the engine at a rotation rate of 5000 rpm for 120 hours. The energy supplied from the ignition coil to each sample in one spark discharge was set to 300 mJ. In the test, the air/fuel ratio was 10.5, the pressure in the combustion chamber of the engine was 62 kPa, and the temperature of the discharge member was 700° C. As for the temperature of the discharge member, the spark plug with a hole having formed therein so as to reach the vicinity of the discharge member was used, and a temperature measuring junction of a thermocouple was disposed in the vicinity of the front end of the base material near the discharge member, whereby the temperature of the discharge member was measured before the tests were started.

After the test, a wear amount ($mm^3$) of the discharge member of each sample was measured using a three dimensional shape measurement device, and the sample Nos. 1 to 37 were categorized into three ranks of A to C according to the wear amount. A sample having a wear amount of less than 0.297 $mm^3$ was determined as A, a sample having a wear amount of 0.297 $mm^3$ or more and less than 0.511 $mm^3$ was determined as B, and a sample having a wear amount of 0.511 $mm^3$ or more was determined as C. The reference value of A, 0.297 $mm^3$, is a wear amount obtained when the same test was performed using a discharge member containing 5% by mass of Pt, with Ir as the remainder. The reference value of C, 0.511 $mm^3$, is a wear amount obtained when the same test was performed using a discharge member containing 32% by mass of Ir, with Pt as the remainder. A chemical composition of the discharge member, a wear amount of the discharge member, and determination based on the wear amount of the sample Nos. 1 to 37 are shown in Table 1 and Table 2.

TABLE 1

| | Chemical composition (% by mass) | | | Wear amount | |
|---|---|---|---|---|---|
| No. | Ni | Co | Ru | ($mm^3$) | Determination |
| 1 | 0.0 | 0.0 | remainder | 0.5684 | C |
| 2 | 0.4 | 0.0 | remainder | 0.5194 | C |
| 3 | 0.5 | 0.0 | remainder | 0.5096 | B |
| 4 | 3.0 | 0.0 | remainder | 0.3430 | B |
| 5 | 4.0 | 0.0 | remainder | 0.3234 | B |
| 6 | 5.0 | 0.0 | remainder | 0.2744 | A |
| 7 | 6.0 | 0.0 | remainder | 0.2107 | A |
| 8 | 7.0 | 0.0 | remainder | 0.1568 | A |
| 9 | 10.0 | 0.0 | remainder | 0.1274 | A |
| 10 | 13.0 | 0.0 | remainder | 0.1705 | A |
| 11 | 16.0 | 0.0 | remainder | 0.1470 | A |
| 12 | 19.0 | 0.0 | remainder | 0.1366 | A |
| 13 | 21.0 | 0.0 | remainder | 0.1960 | A |
| 14 | 25.0 | 0.0 | remainder | 0.2940 | A |
| 15 | 26.0 | 0.0 | remainder | 0.3430 | B |
| 16 | 28.0 | 0.0 | remainder | 0.3874 | B |
| 17 | 30.0 | 0.0 | remainder | 0.4998 | B |
| 18 | 31.0 | 0.0 | remainder | 0.5194 | C |
| 19 | 0.0 | 0.4 | remainder | 0.5292 | C |
| 20 | 0.0 | 0.5 | remainder | 0.5116 | B |
| 21 | 0.0 | 3.0 | remainder | 0.3822 | B |
| 22 | 0.0 | 4.0 | remainder | 0.3430 | B |
| 23 | 0.0 | 5.0 | remainder | 0.2940 | A |
| 24 | 0.0 | 6.0 | remainder | 0.2450 | A |
| 25 | 0.0 | 7.0 | remainder | 0.2352 | A |
| 26 | 0.0 | 10.0 | remainder | 0.2352 | A |
| 27 | 0.0 | 13.0 | remainder | 0.2401 | A |
| 28 | 0.0 | 16.0 | remainder | 0.2352 | A |
| 29 | 0.0 | 19.0 | remainder | 0.2303 | A |
| 30 | 0.0 | 21.0 | remainder | 0.2597 | A |
| 31 | 0.0 | 25.0 | remainder | 0.2940 | A |
| 32 | 0.0 | 26.0 | remainder | 0.3332 | B |
| 33 | 0.0 | 28.0 | remainder | 0.3626 | B |
| 34 | 0.0 | 30.0 | remainder | 0.4900 | B |
| 35 | 0.0 | 31.0 | remainder | 0.5292 | C |

TABLE 2

| | Chemical composition {by mass} | | | | Wear amount | |
|---|---|---|---|---|---|---|
| NO. | NI | Co | $Y_2O_3$ | Ru | ($mm^2$) | Determination |
| 9 | 10.0 | 0.0 | 0.0 | remainder | 0.1274 | A |
| 36 | 10.0 | 0.0 | 6.0 | remainder | 0.0686 | A |
| 24 | 0.0 | 6.0 | 0.0 | remainder | 0.2450 | A |
| 37 | 0.0 | 6.0 | 6.0 | remainder | 0.1862 | A |

As shown in Table 1, Nos. 6 to 14 and 23 to 31 were determined as A, Nos. 3 to 5, 15 to 17, 20 to 22, and 32 to 34 were determined as B, and Nos. 1, 2, 18, 19, and 35 were determined as C. The wear amount of each of Nos. 3 to 17 and 20 to 34 determined as A or B was less than the wear amount of the discharge member containing 32% by mass of Ir, with Pt as the remainder. The wear amount of each of Nos. 6 to 14 and 23 to 31 determined as A was less than the wear amount of the discharge member containing 5% by mass of Pt, with Ir as the remainder. Nos. 3 to 17 and 20 to 34 contain, as a main component, Ru of which an estimated amount of reserves is larger than that of Ir or Pt, and thus it is obvious that the raw material cost can be reduced compared to the discharge member containing Ir or Pt as a main component. Furthermore, it is also obvious that the supply stability of the raw material can be improved compared to the discharge member containing Ir or Pt as a main component.

When Nos. 3 to 17 determined as A or B and Nos. 1, 2, and 18 determined as C were compared, the content of Ni in each of Nos. 3 to 17 was 0.5 to 30% by mass, and the content of Ni in each of Nos. 1, 2, and 18 was less than 0.5% by mass or exceeded 30% by mass. With respect to the discharge member containing Ru as a main component and Ni in a range of 0.5 to 30% by mass, it was found that the wear amount can be reduced, compared to the discharge member containing Ru and Ni that is contained in a proportion outside the above range.

When Nos. 6 to 14 determined as A and Nos. 3 to 5 and 15 to 17 determined as B were compared, the content of Ni in each of Nos. 6 to 14 was 5 to 25% by mass, and the content of Ni in each of Nos. 3 to 5 and 15 to 17 was less than 5% by mass or exceeded 25% by mass. With respect to the discharge member containing Ru as a main component and Ni in a range of 5 to 25% by mass, it was found that the wear amount can be further reduced.

When Nos. 20 to 34 determined as A or B and Nos. 19 and 35 determined as C are compared, the content of Co in each of Nos. 20 to 34 was 0.5 to 30% by mass, and the content of Co in each of Nos. 19 and 35 was less than 0.5% by mass or exceeded 30% by mass. With respect to the discharge member containing Ru as a main component and Co in a range of 0.5 to 30% by mass, it was found that the wear amount can be reduced, compared to the discharge member containing Ru and Co that is contained in a proportion outside the above range.

When Nos. 23 to 31 determined as A and Nos. 20 to 22 and 32 to 34 determined as B were compared, the content of Co in each of Nos. 23 to 31 was 5 to 25% by mass, and the content of Co in each of Nos. 20 to 22 and 32 to 34 was less than 5% by mass or exceeded 25% by mass. With respect to the discharge member containing Ru as a main component and Co in a range of 5 to 25% by mass, it was found that the wear amount can be further reduced.

As shown in Table 2, No. 36 is formed by replacing 6% by mass of Ru in the discharge member of No. 9 with $Y_2O_3$, and No. 37 is formed by replacing 6% by mass of Ru in the discharge member of No. 24 with $Y_2O_3$. Nos. 36 and 37 were also determined as A, similarly to Nos. 9 and 24. In the discharge member containing $Y_2O_3$, also, it was found that the wear amount can be reduced.

While the present invention has been described above with reference to the embodiment, the present invention is not limited to the above embodiment at all. It can be easily understood that various modifications can be devised without departing from the gist of the present invention.

In the embodiment, the case where the discharge member 15 is joined to the base material 14 has been described, but the present invention is not necessarily limited thereto. As a matter of course, an intermediate member may be interposed between the base material 14 and the discharge member 15.

In the embodiment, the case where the discharge member 15 provided to the center electrode 13 is opposed to the discharge member 20 provided to the ground electrode 18 has been described, but the present invention is not necessarily limited thereto. As a matter of course, the discharge member 20 of the ground electrode 18 may be omitted.

In the embodiment, the center electrode 13 is exemplified as the first electrode and the ground electrode 18 is exemplified as the second electrode, but the present invention is not necessarily limited thereto. As a matter of course, the ground electrode 18 may be used as the first electrode and the center electrode 13 may be used as the second electrode. In this case, the discharge member 20 containing Ru as a main component and Ni in a proportion of 0.5 to 30% by mass is fixed to the base material 19 of the ground electrode 18. An intermediate member may be interposed between the base material 19 and the discharge member 20.

When the ground electrode 18 is used as the first electrode, the discharge member 20 is not necessarily fixed to a surface, facing the center electrode 13 side, of the base material 19 of the ground electrode 18. As long as the spark gap 21 is formed between the discharge member 20 and the center electrode 13, the discharge member 20 may be fixed to any surface of the base material 19. As a matter of course, the discharge member 15 of the center electrode 13 may be omitted.

In the embodiment, the case where the base material 19 of the ground electrode 18 joined to the metal shell 17 is bent has been described. However, the present invention is not necessarily limited thereto. As a matter of course, a straight base material may be used, instead of using the bent base material 19. In this case, the front side of the metal shell 17 is extended in an axial line direction and the straight base material is joined to the metal shell 17, whereby the base material is opposed to the center electrode 13. The number of ground electrodes 18 is also set as appropriate.

In the above embodiment, the case where the ground electrode 18 is disposed such that the discharge member 20 is opposed to the center electrode 13 in the axial line direction has been described. However, the present invention is not necessarily limited thereto, and the positional relationship between the ground electrode 18 and the center electrode 13 may be set as appropriate. Another positional relationship between the ground electrode 18 and the center electrode 13 includes disposing the ground electrode 18 such that the side surface of the center electrode 13 and the discharge member 20 of the ground electrode 18 are opposed to each other, for example.

DESCRIPTION OF REFERENCE NUMERALS

10 spark plug
13 center electrode (first electrode)
15 discharge member
18 ground electrode (second electrode)
21 spark gap

What is claimed is:

1. A spark plug comprising:

a center electrode including a base material and a discharge member at a tip of the base material, the discharge member covering a front end of the tip of the base material; and a ground electrode opposed to the discharge member with a spark gap therebetween, wherein the discharge member contains Ru as a main component, and not lower than 0.5% by mass and not higher than 30% by mass of Ni or Co.

2. The spark plug according to claim 1, wherein the discharge member contains not lower than 5% by mass and not higher than 25% by mass of Ni or Co.

3. The spark plug according to claim 1, wherein the discharge member is a sintered material, and wherein a density of the discharge material is not lower than 95%.

* * * * *